US006894095B2

(12) United States Patent
Russo et al.

(10) Patent No.: US 6,894,095 B2
(45) Date of Patent: May 17, 2005

(54) COLOR-CHANGING WALLPAPER ADHESIVE PRIMER/ACTIVATOR

(75) Inventors: Gerald Russo, Downers Grove, IL (US); Merle Houck, Liberty, MO (US); Robert Puchalski, Orland Park, IL (US)

(73) Assignee: The Dial Corporation, Scottsdale, AZ (US)

( * ) Notice: Subject to any disclaimer, the term of this patent is extended or adjusted under 35 U.S.C. 154(b) by 112 days.

(21) Appl. No.: 10/197,195

(22) Filed: Jul. 17, 2002

(65) Prior Publication Data

US 2004/0012622 A1 Jan. 22, 2004

(51) Int. Cl.[7] .......................... B32B 23/08; B44C 7/04; C09J 11/06; C09J 7/04
(52) U.S. Cl. ................. 524/249; 428/511; 428/904.4; 156/378; 156/575
(58) Field of Search ................ 524/249; 428/511, 428/904.4; 156/378, 575

(56) References Cited

U.S. PATENT DOCUMENTS

| 2,249,867 A | | 7/1941 | Snelling |
| 4,231,370 A | | 11/1980 | Mroz et al. |
| 4,293,458 A | | 10/1981 | Gruenberger et al. ...... 260/17.4 |
| 4,452,978 A | * | 6/1984 | Eastman ..................... 536/111 |
| 4,954,544 A | | 9/1990 | Chandaria .................... 524/111 |
| 5,567,753 A | | 10/1996 | Shuman et al. ............. 524/249 |
| 5,716,717 A | * | 2/1998 | Yeung et al. ................ 428/511 |

FOREIGN PATENT DOCUMENTS

| EP | 1 382 653 A1 | 1/2004 |
| GB | 2 278 360 | 11/1994 |

OTHER PUBLICATIONS

Sorensen, "Uber die Messung und die Bedeutung der Wasserstoffionenkonzenentration bei enzymatischen Prozessen," Biochemische Zeitschrift, vol. 21, 131–200 (1909).
Bishop, "Indicators," Pergamon Press, Oxford, England (1972).
Falbe et al., "Rompp Chemie Lexikon" Georg Thieme Verlag, Stuttgart—New York 3022–4724 (1991).
Mills et al., "Equilibrium Studies on Colorimetric Plastic Film Sensors for Carbon Dioxide", Anal. Chem, 64:1393–1389 (1992).

* cited by examiner

Primary Examiner—Kriellion A. Sanders
(74) Attorney, Agent, or Firm—Marshall, Gerstein & Borun LLP

(57) ABSTRACT

Adhesives and primer compositions that include water, a polymer and a pH indicator. The adhesives and primers have a visually-detectable color when wet, and preferably dry to a clear or transparent film, while having good flow and spreadability. The adhesives and primers provide a visual indication of wetness by including a pH indicator such that when the composition is wet, the pH indicator is colored such that the color and the intensity of the color provides a visual indication of wetness; sufficiency of thickness; and uniformity of application of the adhesive or primer.

68 Claims, No Drawings

COLOR-CHANGING WALLPAPER ADHESIVE PRIMER/ACTIVATOR

TECHNICAL FIELD

This invention generally relates to adhesives and primers used in applying wallpaper to walls. More particularly, the invention relates to wallpaper adhesives and primers that are colored when wet and dry clear or transparent for ease in application to ensure that an entire wall, or an entire back side of the wallpaper is completely covered with the adhesive or primer, that the adhesive or primer is applied evenly to the wall or wallpaper, and to easily determine, by color difference, if a portion of the applied adhesive or primer is too dry to function so that additional adhesive or primer can be applied at selected locations.

BACKGROUND OF THE INVENTION AND PRIOR ART

Wallpaper is used to decorate the interior walls of homes, hotels, offices, hospitals and other structures where people live, work and meet. A typical wall is made from a plaster or, in the case of drywall, a gypsum core covered on its major surfaces with paper.

The wallpaper is held to a wall by an adhesive that bonds the wallpaper to the wall. The adhesive can be applied to the wallpaper or to the wall by the person hanging the wallpaper or it can be applied to the wallpaper by the wallpaper manufacturer (e.g., pre-pasted wallpaper), and rehydrated with an activator by the wallpaper hanger prior to hanging. A wallpaper activator is an adhesive that is often used with pre-pasted wallpaper, such that the activator converts the dry pre-pasted wallpaper into wet, tacky pasted wallpaper that is prepared to efficiently adhere to the wall. The adhesives currently in use in the wallpaper industry include wallpaper adhesives (paste), and wallpaper activators.

When applying wallpaper to a wall, it is often advantageous to use a wallpaper primer to prepare the wall for better adherence of the wallpaper. Benefits of using a primer include sealing the surface of the wall to create a surface with a uniform porosity and water resistance and to fix certain defects in the surface of the wall. For example, Liquid Drywall™ (Roman Adhesives, Calumet City, Ill.) is a primer designed to fill in any defects in the surface of the wall and seal the wall to allow wallpaper to be pasted to the entire surface of the wall. For best results, a primer should not only be applied over an entire wall surface, but it should also be applied evenly, in a substantially uniform thickness.

When applying wallpaper it is important to ensure that the adhesive or primer is applied evenly to the wall or to the wallpaper such that there are no areas of the wall or wallpaper that are free of adhesive or primer, that the adhesive or primer is applied in a uniform thickness to the surface of the wall or wallpaper, and that the adhesive or primer has not prematurely dried prior to applying the wallpaper to the wall. When wallpaper is applied, judgment is required in determining whether (1) enough adhesive has been applied so that the entire wall or wallpaper remains wet and sticky upon contact of the wallpaper with the wall; and (2) the adhesive or primer has been applied evenly over the entire surface of the wall or wallpaper. Gruenberger, et al., U.S. Pat. No. 4,293,458, discloses applying a colored or tinted paste to assure complete coating of an adhesive, however, adding a permanent color to an adhesive (or primer) has the disadvantage of permanently coloring the wall or wallpaper which may be visually detected on the face (room-facing) side of the wallpaper, thereby detracting from the wallpaper aesthetics.

There exists a need in the art for a wallpaper adhesive and a primer that provide (1) a visual indication that a sufficient amount or thickness of adhesive or primer has been applied to the wall or wallpaper, (2) a visual indication of a uniform thickness of the applied adhesive or primer, and (3) a visual indication that the adhesive is wet and sufficiently sticky to function at the time of contacting the wallpaper to the wall.

SUMMARY OF THE INVENTION

The wallpaper adhesives and primers disclosed herein have a visually-detectable color when wet, and preferably dry to a clear or transparent film, while having good flow and spreadability. The adhesives and primers provide a visual indication of wetness by including a pH indicator such that when the composition is wet, the pH indicator is colored such that the color and the intensity of the color provides a visual indication of wetness; sufficiency of thickness; and uniformity of application of the adhesive or primer.

Numerous other advantages and features of the wallpaper adhesives and primers described herein will become readily apparent from the following detailed description of the preferred embodiments and the appended claims.

DETAILED DESCRIPTION OF THE PREFERRED EMBODIMENTS

Disclosed herein are compositions and methods of use of adhesives, and primers that visually indicate to a user when the adhesive or primer is sufficiently wet, has been applied in sufficient quantity for application, and/or has been applied evenly. It has been found, quite surprisingly, that the addition of a selected pH indicator to a wallpaper adhesive or a wallpaper primer imparts a color to the adhesive or primer composition when wet and preferably provides a clear or transparent adhesive or primer film when dried. The thickness of the coating of the wet adhesive or primer is indicated by the intensity of the color, wherein a deeper, darker color is shown when a thicker coating is used, thus, when wallpaper is applied one can visually detect if the wallpaper adhesive has been applied evenly to the wall or to the wallpaper. Thus, the adhesives and primers described herein provide a visual indication of a proper wetness; a sufficient amount or thickness; and the evenness or uniformity of the application of the adhesive or primer.

The pH of a given substance is the logarithmic measure of hydrogen ion concentration, originally defined by Danish biochemist Søren Peter Lauritz Sørensen (S. P. L. Sørenson, Biochemische Zeitschrift, 21, 131–200 (1909)):

$$pH=-\log[H^+]$$

where log is a base-10 logarithm and $[H^+]$ is the concentration of the hydrogen ions in moles per liter of solution. The hydrogen ion concentration in pure water around room temperature is about $1.0\times10^{-7}$ M. Thus, water has a pH of 7, and is considered "neutral", because the concentration of hydrogen ions is exactly equal to the concentration of hydroxide ($OH^-$) ions produced by the dissociation of the water. Increasing the concentration of hydrogen ions above $1.0\times10^{-7}$ M produces a solution with a pH of less than 7, and the solution is considered "acidic". Decreasing the concentration below $1.0\times10^{-7}$ M produces a solution with a pH above 7, and the solution is considered "alkaline" or "basic". However, to efficiently measure of the concentration of hydrogen ions, there must be water present in the solution.

The art of using substances that indicate the pH of a given solution have developed such that the indicator is designed to change color upon a change in pH, unusually via an acid-base reaction altering the chromophore of the indicator. See, Bishop, E., *Indicators*, Pergamon, Oxford, 1972. Thus, some pH indicators act primarily in an aqueous solution, such that once water has been removed from the solution, the indicator ceases to give the colorful indication of pH. As a consequence, we have surprisingly found that pH indicators can serve as both an indicator of the pH of a given solution and an indicator of the amount of water in a given solution. More particularly, we have surprisingly found that the use of a pH indicator can serve to indicate when a composition is sufficiently wet, evenly applied, and/or when a sufficient quantity has been applied.

Indicators for use with an adhesive and primer disclosed herein include (with the operable pH range given in parentheses): Alizarin (5.6–7.2; 11.0–12.4); Alizarin Red S (4.6–6.0); Alizarin Yellow R (10.1–12.0); Benzopurpurine 4B (2.2–4.2); 4,4'-Bis(2-amino-1-naphthylazo)-2,2'-stilbenedisulfonic acid (3.0–4.0); 4,4'-Bis(4-amino-1-naphthylazo)-2,2'-stilbenedisulfonic acid (8.0–9.0); Brilliant Yellow (6.6–7.8); Bromocresol Green (3.8–5.4); Bromocresol Purple (5.2–6.8); Bromophenol Blue (3.0–4.6); Bromothymol Blue (6.0–7.6); Chlorophenol Red (5.2–6.8); Clayton Yellow (12.2–13.2); Congo Red (3.0–5.0); o-Cresolphthalein (8.2–9.8); Cresol Red (0.0–1.0; 7.0–8.8); Crystal Violet (0.0–1.8); Curcumin (Turmaric) (7.4–8.6); p-(2,4-Dihydroxyphenylazo) benzenesulfonic acid, sodium salt (11.4–12.6); p-Dimethylaminoazobenzene (2.8–4.4); 4-(4-Dimethylamino-1-naphylazo)-3-methoxybenzenesulfonic acid (3.5–4.8); 2-(p-Dimethylaminophenylazo)pyridine (0.2–1.8; 4.4–5.6); N,N-Dimethyl-p-(m-tolylazo)aniline (2.6–4.8); 2,4-Dinitrophenol (2.0–4.7); 2-(2,4 Dinitrophenylazo)-1-naphthol-3,6-disulfonic acid, disodium salt (6.0–7.0); 6,8-Dinitro-2,4-(1H)quinazolinedione (6.4–8.0); Erythrosin, disodium salt (2.2–3.6); 4-(p-Exthoxyphenylazo)-m-phenylene-diamine monohydrochloride (4.4-5.8); Ethyl bis (2,4-dimethylphenyl) ethanoate (8.4–9.6); Ethyl Orange (3.4–4.8); Ethyl Red (4.0–5.8); Ethyl Violet (0.0–2.4); 5,5'-Indigodisulfonic acid, disodium salt (11.4–13.0); Malachite Green (0.2–1.8); Metacresol Purple (1.2–2.8; 7.4–9.0); Metanil Yellow (1.2–2.4); Methyl Green (0.2–1.8); Methyl Orange (3.2–4.4); Methyl Red (4.8–6.0); Methyl Violet (0.0–1.6); p-Naphtholbenzein (8.2–10.0); Neutral Red (6.8–8.0); p-Nitrophenol (5.4–6.6); m-Nitrophenol (6.8–8.6); Orange IV (1.4–2.8); Paramethyl Red (1.0–3.0); Phenolphthalein (8.2–10.0); Phenol Red (6.6–8.0); 4-Phenylazodiphenylamine (1.2–2.6); 4-Phenylazo-1-naphthylamine (4.0–5.6); Propyl Red (4.8–6.6); Quinaldine Red (1.4–3.2); Resazurin (3.8–6.4); Resorcin Blue (4.4–6.2); Tetrabromophenolphthalein ethyl ester, potassium salt (3.0–4.2); Thymol Blue (1.2–2.8; 8.0–9.6); Thymolphthalein (9.4–10.6); 4-o-Tolylazo-o-toluidine (1.4–2.8); 1,3,5-Trinitrobenzene (12.0–14.0); 2,4,6-Trinitrotoluene (11.5–13.0); and Turmaric (7.4–8.6). The preferred pH indicators for use in the adhesives and primers disclosed herein are colorless at about pH 6.5 to about pH 8 such that when dry the pH indicator contributes the minimal color to the compositions once the composition has dried. Thus, preferred pH indicators include, 6,8-dinitro-2,4-(1H) quinazolinedione (6.4–8.0); p-nitrophenol (5.4–6.6); o-cresolphthalein (8.2–9.8); phenolphthalein (8.2–10.0); Ethyl bis(2,4-dimethylphenyl) ethanoate (8.4–9.6); thymolphthalein (9.4–10.6); 1,3,5-Ttinitrobenzene (12.0–14.0); and 2,4,6-trinitrotoluene (11.5–13.0).

Adhesives

The adhesive compositions include water, an adhesive polymer, and a pH indicator. Optionally, other additives that perform specific functions can be included in the adhesive including, polymer stabilizers, humectants, biocides, pigments, rheology control agents, co-solvents, defoamers and the like. Further, a pH adjuster may be included in the adhesive composition to adjust the pH within the pH range that a particular pH indicator exhibits its characteristic color. Adjustment of pH provides a wider variety of functional pH indicators that are colored when wet and dry to a visually distinguishable color, preferably clear or transparent. It is preferred that the pH indicator does not contribute any color to the adhesive composition after the composition has dried, and therefore, it is preferred that the selected pH indicator is colorless at or near a neutral pH (e.g., pH of about 6.5–8.0) and is colored at a pH above about 8.0 or below about 6.5. Depending on the environmental conditions, particularly humidity, and the porosity of the wallpaper used, an adhesive is considered dry when it is either dry to the touch or there is no further evaporation of water. For example, it may be the case that an adhesive may be dry to the touch with no further evaporation and yet water can be present in the dry adhesive up to about 10% by weight, based on the total weight of the composition due to the atmospheric humidity.

Wallpaper Adhesives

A wallpaper adhesive may be used as an adhesive for pre-pasted wallpaper or the adhesive may be applied as a wet composition onto the wallpaper or the wall. Table I provides operable ranges for the preferred components of the adhesive compositions described herein wherein optional components of the adhesive composition have a weight percent range beginning with zero. There may be other optional components included in the adhesive compositions described herein, and Table I is not intended to exclude any other additives.

TABLE I

| WALLPAPER ADHESIVE | | |
|---|---|---|
| Ingredient | Wt. Range % | Function |
| Water | 20–95 | Solvent |
| Adhesive Polymer | 5–80 | Provides Adhesive Properties To The Composition |
| Polymer Stabilizer | 0–2 | Stabilizes the Polymer |
| Humectants/Salts | 0–30 | Retains Water |
| Biocides (Bactericides and Fungicides) | 0–2 | Prevents Degradation |
| Defoamers | 0–1 | Prevents Foam Formation |
| pH Adjusters | 0–20 | Bring the pH to the desired range |
| pH Indicators | 0.001–5 | Indicates the proper wetness, quantity, and the evenness of the applied adhesive |

An embodiment of a wallpaper adhesive includes water, an adhesive polymer, and a pH indicator, wherein the pH indicator provides a visible color when wet and preferably no visible color when dry.

The adhesive polymer of this embodiment preferably is selected from the group consisting of natural polymers, such as cellulose and starch-based polymers, and synthetic polymers, such as polyvinyl acetate derivatives and copolymers thereof, polyvinyl alcohol derivatives and copolymers thereof, latex derivatives and copolymers thereof, acrylics and copolymers thereof. For example, starch based polymers may be either cold water-soluble starch or processed starch; including, for example, corn starch, wheat starch, potato starch, rice starch, and tapioca starch, wherein corn starch and wheat starch are the preferred starch-based polymers. Moreover, cellulose based polymers may be derivatives of ethyl, methyl and propyl cellulose. Examples of synthetic polymers for use with the adhesives described herein include polyvinylacetate-ethylene copolymer, polyvinylacetate-maleate copolymer, polyvinylacetate-maleate homopolymer and combinations thereof. The adhesive polymer may be present in the adhesive composition from about 5% to about 80% by weight, based on the total weight of the composition. Preferably, the starch-based or cellulose-based adhesive polymer may be present in the wallpaper adhesive from about 5% to about 40% by weight, based on the total weight of the composition. A synthetic polymer, such as a polyvinyl acetate derivative and/or copolymers thereof, and a polyvinyl alcohol derivative and/or copolymers thereof, may be present in the adhesive composition in an amount of about 10% to about 80% by weight, based on the total weight of the composition.

The preferred pH indicators are those that impart a color to the composition when functioning within their operable pH range and are colorless outside of their operable pH range. More preferably, the pH indicators are colorless at or near a neutral pH (e.g., pH of about 6.5 to about 8.0) so that when dry, the pH indicator does not contribute color to the dry composition. Thus, the preferred pH indicators for a wallpaper adhesive include, 6,8-dinitro-2,4-(1H)quinazolinedione; p-nitrophenol; o-cresolphthalein; ethyl bis(2,4-dimethylphenyl) ethanoate; phenolphthalein; thymolphthalein; 1,3,5-trinitrobenzene; 2,4,6-trinitrotoluene; and combinations thereof. More preferably, the pH indicator (s) of the wallpaper adhesives described herein are selected from thymolphthalein, phenolphthalein, and a combination thereof.

The pH indicators act to impart a particular color to the adhesive composition derived from the chromophore of the indicator. The intensity of the color emitted by the chromophore of the pH indicators may vary and, as a result, proper care is given to the selection of the appropriate amount of a pH indicator such that a color is observed in the adhesive composition when it is wet, but does not contribute an appreciable color to the composition when dry. Preferably, the pH indicators are present in the adhesion composition in an amount of about 0.001% to about 5% by weight, based on the total weight of the adhesive composition. More preferably, the pH indicator is present in an adhesive composition in an amount of about 0.01% to about 0.1% by weight, based on the total weight of the composition.

The wallpaper adhesives described herein optionally may include one or more additives selected from a biocide, polymer stabilizer, rheology control agent, defoamer, pH adjuster, humectant, and combinations thereof. A biocide may be an antibacterial compound, an antifungal compound, or combinations of an antifungal and an antibacterial compound. Preferred biocides include a compound selected from the group consisting of 4,4-dimethoxazolidine, 2(hydroxymethyl)amino ethanol, Troysan Polyphase AF-1, methyl benzimidazole-2-yl carbamate, 1,3-dihydroxymethyl-5,5-dimethylhydantoin, 1-hydroxymethyl-5,5-dimethylhydantoin, 2-n-octyl-4-isothiazolin-3-one, and combinations thereof. Preferably, a biocide is present in an adhesive composition from about 0.01% to about 2% by weight, based on the total weight of the composition. A polymer stabilizer optionally may be included in the adhesive composition to increase the thermostability and prevent degradation of the adhesive. A polymer stabilizer optionally may be present in the adhesive from about 0.01% to about 2% by weight, based on the total weight of the composition. In addition, a rheology control agent optionally may be added to the adhesive composition to control the flow properties. A rheology control agent optionally may be present in the adhesive composition in an amount of about 0.1% to about 25% by weight, based on the total weight of the composition. A defoamer optionally may be added to prevent or decrease foaming of the adhesive composition. A defoamer optionally may be present in the adhesive composition in an amount of about 0.01% to about 4% by weight, based on the total weight of the composition. Further, humectants optionally may be included to improve the ability of the adhesive composition to retain water. A humectant can be present in the adhesive composition in an amount of about 0.1% to about 20% by weight, based on the total weight of the composition.

To control the overall pH of an adhesive composition, one or more pH adjusters may be added to the adhesive composition. A pH adjuster may be either a volatile pH adjuster (e.g., ammonia) or a non-volatile pH adjuster (e.g., sodium hydroxide). When a non-volatile pH adjuster is use in an adhesive, the pH of the adhesive is not significantly altered by the drying process, such that the pH of the dried adhesive can still be within the operable range of the pH indicator. This provides the adhesive with the ability to serve as an indicator upon the re-wetting of the adhesive. In contrast, if a sufficiently volatile pH adjuster was used, such as ammonia, the drying process would include the removal of the pH adjuster (e.g., via evaporation) and a change in the pH of the adhesive composition such that the dried adhesive may be outside of the operable pH range for a given pH indicator, and as a consequence the dried adhesive will not indicate the wetness if the adhesive is re-wet with a neutral solution (e.g., water.) However, when a volatile pH adjuster has been removed, the adhesive can be re-wet with an acidic or basic solution (e.g., an aqueous ammonia solution), and this re-wetting with a non-neutral solution can place the pH of the adhesive within the operable pH range of the pH indicator and allow the adhesive to indicate where the adhesive is on the wall or the wallpaper. A pH adjuster may be basic or acidic, and may increase or decrease the pH of the adhesive composition. Basic compounds that can serve as pH adjusters include compounds such as sodium hydroxide, 2-amino-2-methyl-1-propanol, ammonia, and the like. Acidic compounds that can serve as pH adjusters include phosphoric acid, hydrochloric acid, and citric acid. A pH adjuster optionally may be present in the adhesive composition in an amount of about 0.01% to about 20% by weight, based on the total weight of the composition.

A "wet, colored adhesive" as used herein refers to an adhesive that is colored by the distinctive coloring provided by a particular pH indicator. For example, a "wet colored adhesive," where the adhesive includes an effective amount of thymolphthalein will be a blue colored adhesive.

Another embodiment of the invention is a method of adhering a paper to a wall comprising, applying a wet, colored adhesive to the wall or to the back surface of the paper, and prior to adhering the back surface to the wall, inspecting the adhesive for continuous color on the entire area where adhesive was applied, and then applying more of the wet, colored adhesive or more water where the adhesive is colorless, and then adhering the paper to the wall, and allowing the wet, colored adhesive to dry and become colorless. This method allows for an efficient application of wallpaper to walls by helping to prevent the peeling of the paper from the wall.

A wet, colored adhesive used according to this embodiment includes, water, an adhesive polymer, and a pH indicator, wherein the pH indicator provides a visible color when wet and provides no visible color when dry. Preferably, the pH indicator(s) of the wallpaper adhesives described herein are selected from thymolphthalein, phenolphthalein, and a combination thereof. Preferably, the pH indicators are present in the adhesion composition in an amount of about 0.001% to about 5% by weight, based on the total weight of the adhesive composition. More preferably, the pH indicator is present in an adhesive composition in an amount of about 0.01% to about 0.1% by weight, based on the total weight of the composition.

Preferably, the pH indicators are present in the adhesion composition in an amount of about 0.001% to about 5% by weight, based on the total weight of the adhesive composition. More preferably, the pH indicator is present in an adhesive composition in an amount of about 0.01% to about 0.1% by weight, based on the total weight of the composition. Optionally, the wet colored adhesive composition further includes an additive selected from the group including of a biocide, polymer stabilizer, rheology control agent, defoamer, pH adjuster, humectant, and the like.

Wallpaper Activator

A wallpaper activator is most often used in conjunction with pre-pasted wallpaper wherein the activator functions to wet a dried adhesive coating on a back surface of the pre-pasted wallpaper to prepare the pre-pasted wallpaper to adhere to the wall. As with the wallpaper adhesives described above, there are several advantages to the use of an activator with a visual indication of wetness. For example, it is very common when preparing (activating) pre-pasted wallpaper for adhering to a wall that one or more spots or areas on the pre-pasted paper is not activated or wetted sufficiently; dries prematurely; or is too wet for proper adherence to a wall. The wallpaper activators described herein include a pH indicator that provides a visual indication of these and other problems that adversely affect the installation of wallpaper.

Table II provides operable ranges for preferred components of the wallpaper activators of the present invention, wherein the optional elements of an activator have a weight percent range beginning with zero. There may be other optional components included in the wallpaper activators described herein, and Table II is not intended to exclude any other additives.

TABLE II

WALLPAPER ACTIVATOR

| Ingredient | Wt. Range % | Function |
|---|---|---|
| Water | 60–99.1 | Solvent |
| Adhesive Polymer | 0.1–40 | Provides Adhesive Properties To The Composition |
| Rheology Control Agents | 0–20 | Controls the Viscosity |
| Biocides (Bactericide and Fungicides) | 0–2 | Prevents Degradation |
| Co-Solvent | 0–5 | Converts the Activator to a film or other form |
| pH Adjusters | 0–20 | Bring the pH to the desired range |

TABLE II-continued

WALLPAPER ACTIVATOR

| Ingredient | Wt. Range % | Function |
|---|---|---|
| pH Indicators | 0.001–5 | Indicates the proper wetness, quantity, and the evenness of the applied adhesive |

The composition of the wallpaper activators described herein includes water, an adhesive polymer, and a pH indicator. Water preferably is included in the activator composition in an amount of about 60% to about 99.1% by weight, based on the total weight of the composition.

The adhesive polymer of the activator composition preferably is selected from the group consisting of natural polymers such as cellulose-based and starch-based polymers; and synthetic polymers such as polyvinyl acetate derivatives and copolymers thereof, polyvinyl alcohol derivatives and copolymers thereof, latex derivatives and copolymers thereof, acrylics and copolymers thereof. For example, starch based polymers may be either cold water-soluble starch or processed starch including, for example, corn starch, wheat starch, potato starch, rice starch, and tapioca starch. Corn starch and wheat starch are the preferred starch-based polymers. Moreover, cellulose based polymers may be derivatives of ethyl, methyl and propyl cellulose. Examples of synthetic polymers for use with the activators described herein include polyvinylacetate-ethylene copolymer, polyvinylacetate-maleate copolymer, polyvinylacetate-maleate homopolymer and combinations thereof. The adhesive polymer may be present in the activator composition in an amount of about 0.1% to about 40% by weight, based on the total weight of the composition. Preferably, the starch-based or cellulose-based adhesive polymer is present in the wallpaper activator in an amount of about 5% to about 40% by weight, based on the total weight of the composition.

The preferred pH indicators are those that impart a color to the composition within their operable pH range and are colorless outside of their operable pH range. More preferably, the pH indicators preferably are colorless at or near a neutral pH (e.g., pH 6.5–8). This is preferred because when the activator composition is dry a pH indicator that is colored at a neutral pH might still contribute color to the dry composition. Thus, the preferred pH indicators for a wallpaper activator include, 6,8-dinitro-2,4-(1H) quinazolinedione; p-nitrophenol; o-cresolphthalcin; ethyl bis(2,4-dimethylphenyl) ethanoate; phenolphthalein; thymolphthalein; 1,3,5-trinitrobenzene; 2,4,6-trinitrotoluene; and combinations thereof. Preferably, the pH indicators of a wallpaper activator are thymolphthalein and phenolphthalein.

The pH indicators act to impart a particular color to the activator composition derived from the chromophore of the indicator. The intensity of the color emitted by the chromophore of the pH indicators may vary and, as a result, proper care is given to the selection of the appropriate amount of a pH indicator such that a color is observed in the activator composition when it is wet, but does not contribute an appreciable color to the composition when dry. Preferably, the pH indicators are present in the adhesion composition in an amount of about 0.001% to about 5% by weight, based on the total weight of the activator composition. More preferably, the pH indicator is present in an activator composition in an amount of about 0.01% to about 0.1% by weight, based on the total weight of the composition.

The wallpaper activators described herein optionally may include one or more additives selected from a biocide, polymer stabilizer, rheology control agent, defoamer, pH adjuster, humectant, and combinations thereof. A biocide may be an antibacterial compound, an antifungal compound, or combinations of an antifungal and an antibacterial compound. Preferred biocides include a compound selected from the group consisting of 4,4-dimethoxazolidine, 2(hydroxymethyl)amino ethanol, Troysan Polyphase AF-1, methyl benzimidazole-2-yl carbamate, 1,3-dihydroxymethyl-5,5-dimethylhydantoin, 1-hydroxymethyl-5,5-dimethylhydantoin, 2-n-octyl-4-isothiazolin-3-one, and combinations thereof. Preferably, a biocide is present in an activator composition from about 0.01% to about 2% by weight, based on the total weight of the composition. A polymer stabilizer optionally may be included in the activator composition to increase the thermostability and prevent degradation of the activator. A polymer stabilizer optionally may be present in the activator from about 0.01% to about 2% by weight, based on the total weight of the composition. In addition, a rheology control agent optionally may be added to the activator composition to control the flow properties. A rheology control agent optionally may be present in the activator composition in an amount of about 0.1% to about 25% by weight, based on the total weight of the composition. A defoamer optionally may be added to prevent or decrease foaming of the activator composition. A defoamer optionally may be present in the activator composition in an amount of about 0.01% to about 4% by weight, based on the total weight of the composition. Further, humectants optionally may be included to improve the ability of the activator composition to retain water. A humectant can be present in the activator composition in an amount of about 0.1% to about 20% by weight, based on the total weight of the composition.

To control the overall pH of an activator composition, one or more pH adjusters may be added to the activator composition. A pH adjuster may be either a volatile pH adjuster (e.g., ammonia) or a non-volatile pH adjuster (e.g., sodium hydroxide). When a non-volatile pH adjuster is use in an activator, the pH of the activator is not significantly altered by the drying process, such that the pH of the dried activator can still be within the operable range of the pH indicator. This provides the activator with the ability to serve as an indicator upon the re-wetting of the activator. In contrast, if a sufficiently volatile pH adjuster was used, such as ammonia, the drying process would include the removal of the pH adjuster (e.g., via evaporation) and a change in the pH of the activator composition such that the dried activator may be outside of the operable pH range for a given pH indicator, and as a consequence the dried activator cannot again serve as an indicator of wetness. A pH adjuster may be basic or acidic, and may increase or decrease the pH of the activator composition. Basic compounds that can serve as pH adjusters include compounds such as sodium hydroxide, 2-amino-2-methyl-1-propanol, ammonia, and the like. Acidic compounds that can serve as pH adjusters include phosphoric acid, hydrochloric acid, and citric acid. A pH adjuster optionally may be present in the activator composition in an amount of about 0.01% to about 20% by weight, based on the total weight of the composition.

In another embodiment of an adhesive of the disclosure, a wallpaper adhesive composition including water, and an adhesive polymer, is improved by the addition of a sufficient amount of a pH indicator such that the pH indicator imparts a visible color to the adhesive composition when the adhesive composition is wet and does not impart a visible color to the adhesive composition when the adhesive composition is dry. According to this embodiment a sufficient amount of a pH indicator is added to any adhesive composition, including any wallpaper adhesive or a wallpaper activator, such that the composition exhibits a color to indicate that the composition is sufficiently wet for application, that a sufficient amount of the adhesive composition has been applied, and/or to ensure that the adhesive has been applied uniformly.

The preferred pH indicators are those that impart a color to the composition when functioning within their operable pH range and are colorless outside of their operable pH range. More preferably, the pH indicators are colorless at or near a neutral pH (e.g., pH of about 6.5 to about 8.0) so that when dry, the pH indicator does not contribute color to the dry composition. Thus, the preferred pH indicators for a wallpaper adhesive include, 6,8-dinitro-2,4-(1H) quinazolinedione; p-nitrophenol; o-cresolphthalein; ethyl bis(2,4-dimethylphenyl) ethanoate; phenolphthalein; thymolphthalein; 1,3,5-trinitrobenzene; 2,4,6-trinitrotoluene; and combinations thereof. More preferably, the pH indicator (s) of the wallpaper adhesives described herein are selected from thymolphthalein, phenolphthalein, and a combination thereof.

The pH indicators act to impart a particular color to the adhesive composition derived from the chromophore of the indicator. The intensity of the color emitted by the chromophore of the pH indicators may vary and, as a result, proper care is given to the selection of the appropriate amount of a pH indicator such that a color is observed in the adhesive composition when it is wet, but does not contribute an appreciable color to the composition when dry. Preferably, the pH indicators are present in the adhesion composition in an amount of about 0.001% to about 5% by weight, based on the total weight of the adhesive composition. More preferably, the pH indicator is present in an adhesive composition in an amount of about 0.01% to about 0.1% by weight, based on the total weight of the composition.

The adhesive polymer of this embodiment preferably is selected from the group consisting of natural polymers, such as cellulose and starch-based polymers, and synthetic polymers, such as polyvinyl acetate derivatives and copolymers thereof, polyvinyl alcohol derivatives and copolymers thereof, latex derivatives and copolymers thereof, acrylics and copolymers thereof. For example, starch based polymers may be either cold water-soluble starch or processed starch; including, for example, corn starch, wheat starch, potato starch, rice starch, and tapioca starch, wherein corn starch and wheat starch are the preferred starch-based polymers. Moreover, cellulose based polymers may be derivatives of ethyl, methyl and propyl cellulose. Examples of synthetic polymers for use with the adhesives described herein include polyvinylacetate-ethylene copolymer, polyvinylacetate-maleate copolymer, polyvinylacetate-maleate homopolymer and combinations thereof. The adhesive polymer may be present in the adhesive composition from about 5% to about 80% by weight, based on the total weight of the composition. Preferably, the starch-based or cellulose-based adhesive polymer may be present in the wallpaper adhesive from about 5% to about 40% by weight, based on the total weight of the composition. A synthetic polymer, such as a polyvinyl acetate derivative and/or copolymers thereof, and a polyvinyl alcohol derivative and/or copolymers thereof, may be present in the adhesive composition in an amount of about 10% to about 80% by weight, based on the total weight of the composition.

The wallpaper adhesives described herein optionally may include one or more additives selected from a biocide, polymer stabilizer, rheology control agent, defoamer, pH adjuster, humectant, and combinations thereof. A biocide may be an antibacterial compound, an antifungal compound, or combinations of an antifungal and an antibacterial compound. Preferred biocides include a compound selected from the group consisting of 4,4-dimethoxazolidine, 2(hydroxymethyl)amino ethanol, Troysan Polyphase AF-1, methyl benzimidazole-2-yl carbamate, 1,3-dihydroxymethyl-5,5-dimethylhydantoin, 1-hydroxymethyl-5,5-dimethylhydantoin, 2-n-octyl-4-isothiazolin-3-one, and combinations thereof. Preferably, a biocide is present in an adhesive composition from about 0.01% to about 2% by weight, based on the total weight of the composition. A polymer stabilizer optionally may be included in the adhesive composition to increase the thermostability and prevent degradation of the adhesive. A polymer stabilizer optionally may be present in the adhesive from about 0.01% to about 2% by weight, based on the total weight of the composition. In addition, a rheology control agent optionally may be added to the adhesive composition to control the flow properties. A rheology control agent optionally may be present in the adhesive composition in an amount of about 0.1% to about 25% by weight, based on the total weight of the composition. A defoamer optionally may be added to prevent or decrease foaming of the adhesive composition. A defoamer optionally may be present in the adhesive composition in an amount of about 0.01% to about 4% by weight, based on the total weight of the composition. Further, humectants optionally may be included to improve the ability of the adhesive composition to retain water. A humectant can be present in the adhesive composition in an amount of about 0.1% to about 20% by weight, based on the total weight of the composition.

To control the overall pH of an adhesive composition, one or more pH adjusters may be added to the adhesive composition. A pH adjuster may be either a volatile pH adjuster (e.g., ammonia) or a non-volatile pH adjuster (e.g., sodium hydroxide). When a non-volatile pH adjuster is use in an adhesive, the pH of the adhesive is not significantly altered by the drying process, such that the pH of the dried adhesive can still be within the operable range of the pH indicator. This provides the adhesive with the ability to serve as an indicator upon the re-wetting of the adhesive. In contrast, if a sufficiently volatile pH adjuster was used, such as ammonia, the drying process would include the removal of the pH adjuster (e.g., via evaporation) and a change in the pH of the adhesive composition such that the dried adhesive may be outside of the operable pH range for a given pH indicator, and as a consequence the dried adhesive cannot again serve as an indicator of wetness. A pH adjuster may be basic or acidic, and may increase or decrease the pH of the adhesive composition. Basic compounds that can serve as pH adjusters include compounds such as sodium hydroxide, 2-amino-2-methyl-1-propanol, ammonia, and the like. Acidic compounds that can serve as pH adjusters include phosphoric acid, hydrochloric acid, and citric acid. A pH adjuster optionally may be present in the adhesive composition in an amount of about 0.01% to about 20% by weight, based on the total weight of the composition.

Primers

A primer is a wall coating that prepares the wall for a particular purpose, including for an adhesive or for a layer of paint. A primer acts to provide a flat surface with a uniform porosity, and allows the adhesive to adhere the entire surface of the wall. In addition, when applying an adhesive or a pasted wallpaper to a wall there may be need to allow the adhesive or pasted wallpaper to dry over a long time (e.g., up to 1–2 weeks), thus a primer imparts the necessary water resistance to the surface of the wall to allow for a long-drying time. Depending on the environmental conditions and the porosity of the wallpaper used, a primer is considered dry when it is either dry to the touch or there is no further evaporation of water. For example, it may be the case that a primer may be dry to the touch with no further evaporation and yet water can be present in the dry primer up to about 10% by weight, based on the total weight of the composition due to the atmospheric humidity.

Wallpaper Primers

The composition of a wallpaper primer of the disclosure includes water, a polymer, and a pH indicator. Table III provides operable ranges for preferred components of the wallpaper primers of the present invention, wherein the optional elements of a primer have a weight percent range beginning with zero. There may be other optional components included in the wallpaper primers described herein, and Table III is not intended to exclude any other additives.

TABLE III

WALLPAPER PRIMER

| Ingredient | Wt. Range % | Function |
| --- | --- | --- |
| Water | 50–95 | Solvent |
| Polymer | 5–50 | Polymer Matrix |
| Rheology Control Agents | 0–8 | Controls the Viscosity |
| Biocides (Bactericide and Fungicides) | 0–2 | Prevents Degradation |
| Co-Solvent | 0–5 | Converts the primer to a film or other form |
| Pigments | 0–35 | Colors the Primer |
| pH Adjusters | 0–20 | Bring the pH to the desired range |
| pH Indicators | 0.001–5 | Indicates the proper wetness and even application |

The composition of the wallpaper primers described herein includes water, a polymer, and a pH indicator. Water preferably is included in the primer composition in an amount of about 50% to about 95% by weight, based on the total weight of the composition.

The polymer of this embodiment preferably is selected from the group including acrylic based polymers and copolymers thereof, vinyl acetate based polymers and copolymers thereof, styrene butadiene rubbers and copolymers thereof, latex and copolymer thereof, and combinations thereof. Preferably, the polymer is an acrylic or a vinyl acetate based polymer, for example styrene acrylic, vinyl acrylic and polymers are particularly useful in the primers disclosed herein. The polymer may be present in the primer composition in an amount from about 5% to about 50% by weight, based on the total weight of the composition. More preferably, the polymer may be present in the primer composition in an amount from about 10% to about 30% by weight, based on the total weight of the composition.

The preferred pH indicators are those that impart a color to the composition when functioning within their operable pH range and are colorless outside of their operable pH range. More preferably, the pH indicators are colorless at or near a neutral pH (e.g., pH of about 6.5 to about 8.0) so that when dry, the pH indicator does not contribute color to the dry composition. Thus, the preferred pH indicators for a wallpaper primer include, 6,8-dinitro-2,4-(1H)

quinazolinedione; p-nitrophenol; o-cresolphthalein; ethyl bis(2,4-dimethylphenyl) ethanoate; phenolphthalein; thymolphthalein; 1,3,5-trinitrobenzene; 2,4,6-trinitrotoluene; and combinations thereof. More preferably, the pH indicator (s) of the wallpaper adhesives described herein are selected from thymolphthalein, phenolphthalein, and a combination thereof.

The pH indicators act to impart a particular color to the primer composition derived from the chromophore of the indicator. The intensity of the color emitted by the chromophore of the pH indicators may vary and, as a result, proper care is given to the selection of the appropriate amount of a pH indicator such that a color is observed in the primer composition when it is wet, but does not contribute an appreciable color to the composition when dry. Preferably, the pH indicators are present in the adhesion composition in an amount of about 0.001% to about 5% by weight, based on the total weight of the primer composition. More preferably, the pH indicator is present in a primer composition in an amount of about 0.01% to about 0.1% by weight, based on the total weight of the composition.

The wallpaper primers described herein optionally may include one or more additives selected from a biocide, polymer stabilizer, rheology control agent, defoamer, pH adjuster, humectant, and combinations thereof. A biocide may be an antibacterial compound, an antifungal compound, or combinations of an antifungal and an antibacterial compound. Preferred biocides include a compound selected from the group consisting of 4,4-dimethoxazolidine, 2(hydroxymethyl)amino ethanol, Troysan Polyphase AF-1, methyl benzimidazole-2-yl carbamate, 1,3-dihydroxymethyl-5,5-dimethylhydantoin, 1-hydroxymethyl-5,5-dimethylhydantoin, 2-n-octyl-4-isothiazolin-3-one, and combinations thereof. Preferably, a biocide is present in a primer composition from about 0.01% to about 2% by weight, based on the total weight of the composition. A polymer stabilizer can optionally be included in a primer composition to increase the thermostability and prevent degradation of the primer. A polymer stabilizer optionally may be present in a primer from about 0.01% to about 2% by weight, based on the total weight of the composition. In addition, a rheology control agent optionally may be added to the primer composition to control the flow properties. A rheology control agent optionally may be present in the primer composition in an amount of about 0.1% to about 25% by weight, based on the total weight of the composition. A defoamer optionally may be added to prevent or decrease foaming of the primer composition. A defoamer optionally may be present in the primer composition in an amount of about 0.01% to about 4% by weight, based on the total weight of the composition. Further, humectants optionally may be included to improve the ability of the primer composition to retain water. A humectant can be present in the primer composition in an amount of about 0.1% to about 20% by weight, based on the total weight of the composition.

To control the overall pH of a primer composition, one or more pH adjusters may be added to the primer composition. A pH adjuster may be either a volatile pH adjuster (e.g., ammonia) or a non-volatile pH adjuster (e.g., sodium hydroxide). When a non-volatile pH adjuster is use in a primer, the pH of the primer is not significantly altered by the drying process, such that the pH of the dried primer can still be within the operable range of the pH indicator. This provides the primer with the ability to serve as an indicator upon the re-wetting of the primer. In contrast, if a sufficiently volatile pH adjuster was used, such as ammonia, the drying process would include the removal of the pH adjuster (e.g., via evaporation) and a change in the pH of the primer composition such that the dried primer may be outside of the operable pH range for a given pH indicator, and as, a consequence the dried primer cannot again serve as an indicator of wetness. A pH adjuster may be basic or acidic, and may increase or decrease the pH of the primer composition. Basic compounds that can serve as pH adjusters include compounds such as sodium hydroxide, 2-amino-2-methyl-1-propanol, ammonia, and the like. Acidic compounds that can serve as pH adjusters include phosphoric acid, hydrochloric acid, and citric acid. A pH adjuster optionally may be present in the primer composition in an amount of about 0.01% to about 20% by weight, based on the total weight of the composition.

Although the adhesives and primers described herein are susceptible to embodiments in many different forms, they are described in detail herein, presently preferred embodiments of adhesives and primers that are colored when wet, and when dry they return to the natural color of the adhesive or primer. It should be understood, however, that the present description is to be considered as an exemplification of the principles of the adhesives and primers, and is not intended to limit the invention to the described embodiments.

The following are representative examples of wallpaper adhesives and primers, these examples however, are not intended to be limiting of the embodiments of adhesives and primers.

EXAMPLE I

PREFERRED WALLPAPER ADHESIVE

| Ingredient/Trade Name | Preferred Wt. (lbs) | Preferred Wt. % | Function |
|---|---|---|---|
| Water | 3750 | 84.415 | Solvent |
| 2(hydroxymethyl)amino ethanol/Troysan 174 (CAS: 34335-28-5) | 12 | 0.27 | Biocide |
| Sodium Tallowater/Coconut oil/ Anar 545 soap (CAS: 8052480) | 24 | 0.54 | Polymer Stabilizer |
| Glycerated Hydrogenated Fat/Pro EM 75K | 12 | 0.27 | Polymer Stabilizer |
| wheat starch/Supergel Starch (CAS: 9005-25-8) | 600 | 13.506 | Polymer |
| Methylhydroxyethyl-Cellulose/Culminel 6000 PR (CAS: 9032-42-2) | 20 | 0.45 | Rheology Control Agent |
| Defoamer/Antifoam NL-52 | 4 | 0.09 | Defoamer |
| 2-amino-2-methyl-1-propanol (CAS: 124-68-5)/AMP-95 (95% in water) (Ashland Specialty Chemical Co.) | 15 | 0.338 | pH Adjuster |
| Thymolphthalein (CAS: 125-20-2) (Aldrich Chemical Company) | 0.088 | 0.002 | pH Indicator |
| Denatured Ethanol (CAS: 64-17-5) (Aldrich Chemical Company) | 5.226 | 0.118 | Solvent for pH Indicator |

The components are mixed in a conventional mixer such as a paddle blade mixer. The water (3750 lbs) is introduced into the mixer, agitation is started, and the mixer contents are heated to 200° F.

EXAMPLE II

ALTERNATIVE WALLPAPER ADHESIVE I

| Ingredient/Tradename | Preferred Wt. (lbs.) | Preferred Wt. % | Function |
|---|---|---|---|
| Water | 16,568 | 76.6576 | Solvent |
| Acid hydrolyzed starch (Eclipse B Starch) (CAS: 65996-63-6) | 4,000 | 18.5074 | Polymer |
| Glycerol Monostearate (40–45%) Glycerol Destearate (49–57%) Glycerin (3–6%)/ Stepan GMS (Vopak USA, Inc.) | 70 | 0.3239 | Polymer Stabilizer |
| Sodium Hydroxide (50% aqueous solution) CAS: 001310-73-2) | 8 | 0.037 | pH Adjuster |
| Hydrogen Peroxide (35% active in water) (CAS: 007722-84-1) | 50 | 0.2313 | Removes Trace Color |
| Sodium Nitrate (solid) (CAS: 7631-99-4) | 800 | 3.7015 | Humectant |
| 4,4-dimethoxazolidine/Troysan 192 (CAS: 51200-87-4) (Troy Chemical Company) | 75 | 0.347 | Biocide |
| Troysan Polyphase AF-1 (Troy Chemical Company) | 7 | 0.0324 | Biocide |
| Defoamer/Antifoam HL-52 (Harcros Chemicals, Inc.) | 9 | 0.0416 | Defoamer |
| Thymolphthalein (CAS: 125-20-2) (Aldrich Chemical Company) | 0.4317 | 0.002 | pH Indicator |
| Denatured Ethanol (CAS: 64-17-5) (Aldrich Chemical Company) | 25.512 | 0.118 | Solvent for pH Indicator |

The components are mixed in a conventional mixer such as a paddle blade mixer. The first aliquot of water (10,960 lbs) is introduced into the mixer, agitation is started, and the water is heated to 120° F. The Eclipse B Starch (4,000 lbs), Antifoam HL-52 (9 lbs), Stepan GMS (70 lbs), and Sodium Hydroxide (8 lbs) is then introduced into the mixer. The mixture is mixed for 5 minutes, and then heated to 180° F. for 20 minutes. Then a second aliquot of water (5608 lbs), hydrogen peroxide (50 lbs), and sodium nitrite (8 lbs) are introduced into the mixer. The resulting mixture is allowed to mix and cool until the temperature reaches 140° F. Then, at a temperature below 140° F. the Troysan 192 (75 lbs of biocide) is added to the mixture followed by mixing for 10 minutes. Next the second biocide is added Troysan Polyphase AF-1 (7 lbs). The contents of the mixer are then permitted to cool and the Thymolphthalein (0.4317 lb dissolved in 25.512 lbs of denatured ethanol) is added and the mixture is allowed to cool to room temperature.

EXAMPLE III

PREFERRED WALLPAPER PRIMER

| Ingredient/Tradename | Preferred Wt. (lbs.) | Preferred Wt. % | Function |
|---|---|---|---|
| Water | 22,495 | 78.317 | Solvent |
| Polyurethane resin (7–18%) Diethylene glycol monobutyl ether (20–21%) Water 61–63% Acrysol ™ (SCT-275) (Rhom and Haas Company) | 209 | 0.7276 | Rheology Control Agent |
| Foamaster SA-3 (Oil-based Defoamer) Cognis Corporation) | 16 | 0.0557 | Defoamer |
| Acrylic polymer (30% in water)/Acrysol ® TT-935 (Rohm and Haas Company) | 471 | 1.6398 | Rheology Control Agent |
| Latex Emulsion/Aquamac 510 (50% latex in water) (Eastman Chemical Company) | 5025 | 17.4947 | Polymer |
| 4,4-dimethoxazolidine/ Troysan 192 (CAS: 51200-87-4) (Troy Chemical Company) | 77 | 0.2681 | Biocide |
| Ammonia (28%) (CAS: 12125-02-9) (Jayar-Hoag Chemical Co., Inc.) | 148 | 0.5153 | pH Adjuster |
| HALOX ® XTAIN ® L-44 (Halox) | 90 | 0.3133 | Prevents Tannin Stains |
| SURFYNOL ™ 104A Surfactant 50% 2-Ethyl-1-Hexanol (CAS: 104-76-7), 50% 2,4,7,9-Tetramethyl-5-Decyne-4,7-Diol (CAS: 126-86-3) (Air Products and Chemicals, Inc.) | 20 | 0.0696 | Surfactant |
| Troysan Polyphase AF-1 (Troy Chemical Company) | 12 | 0.0418 | Biocide |
| 2,2,4-trimethyl-1,3-pentanediol mono (2-methylpropanoate)/ TEXANOL (CAS: 025265-77-4) (Eastman Chemical Company) | 126 | 0.4387 | Co-solvent |
| Thymolphthalein (CAS: 125-20-2) (Aldrich Chemical Company) | 0.574 | 0.002 | pH Indicator |
| Denatured Ethanol (CAS: 64-17-5) (Aldrich Chemical Company) | 33.905 | 0.118 | Solvent for pH Indicator |

The components are mixed in a conventional mixer such as a paddle blade mixer. The water (22,347 lbs) is introduced into the mixer, agitation is started as soon as the water covers the mixing blade. While the water is being introduced into the mixer the SCT-275 (209 lbs, rheology control agent), Acrysol® TT-935 275 (471 lbs, rheology control agent), Foamaster SA-3 (16 lbs) are introduced into the mixture. After mixing of the mixture for a few minutes, the Aquamac 510 (5025 lbs, latex polymer) and mixing continued for 20 minutes. Then Troysan 192 (77 lbs) and a pre-mixed solution of ammonia (148 lbs) and water (148 lbs) are added to the mixture. After 30 minutes of mixing the HALOX® XTAIN® L-44 (90 lbs), SURFYNOL™ 104A (20 lbs), TEXANOL (126 lbs), and Troysan Polyphase AF-1 (12 lbs) are added to the mixture. Lastly, the Thymolphthalein (0.574 lb dissolved in 33.905 lbs of denatured ethanol) is added to the mixture and the mixture is allowed to mix for 30 minutes.

EXAMPLE IV

ALTERNATIVE WALLPAPER PRIMER

| Ingredient/Tradename | Preferred Wt. (lbs.) | Preferred Wt. % | Function |
|---|---|---|---|
| Water | 18,452 | 62.798 | Solvent |
| Troysan Polyphase AF-1 (Troy Chemical Company) | 11 | 0.037 | Biocide |
| ESI-CRYL 715 (Styrene Acrylic Copolymer Emulsion) (Cook Composites and Polymers Co.) | 9888 | 33.652 | Polymer |
| Foamaster SA-3 (Oil-based Defoamer) (Cognis Corporation) | 22 | 0.075 | Defoamer |
| Polyurethane resin (7–18%) Diethylene glycol monobutyl ether (20–21%) Water 61–63% Acrysol ™ (SCT-275) (Rohm and Haas Company) | 158 | 0.538 | Rheology Control Agents |
| Acrylic polymer (30% in water)/Acrysol ® TT-935 (Rohm and Haas Company) | 321 | 1.092 | Rheology Control Agents |
| 4,4-dimethoxazolidine/ Troysan 192 (CAS: 51200-87-4) (Troy Chemical Company) | 66 | 0.225 | Biocide |
| Ammonia (28%) (CAS: 12125-02-9) (Jayar-Hoag Chemical Co., Inc.) | 126 | 0.429 | pH Adjuster |
| HALOX ® XTAIN ® L-44 (Halox) | 59 | 0.201 | Prevents Tannin Stains |
| SURFYNOL ™ 104A Surfactant 50% 2-Ethyl-1-Hexanol (CAS: 104-76-7), 50% 2,4,7,9-Tetramethyl-5-Decyne-4,7-Diol (CAS: 126-86-3) (Air Products and Chemicals, Inc.) | 22 | 0.075 | Surfactant |
| 2,2,4-trimethyl-1,3-pentanediol mono (2-methylpropanoate)/ TEXANOL (CAS: 025265-77-4) (Eastman Chemical Company) | 223 | 0.759 | Co-solvent |
| Thymolphthalein (CAS: 125-20-2) (Aldrich Chemical Company) | 0.587 | 0.002 | pH Indicator |
| Denatured Ethanol (CAS: 64-17-5) (Aldrich Chemical Company) | 34.684 | 0.118 | Solvent for pH Indicator |

The components are mixed in a conventional mixer such as a paddle blade mixer. The water (16,670 lbs) is introduced into the mixer, agitation is started as soon as the water covers the mixing blade. While the water is being introduced into the mixer the Troysan Polyphase AF-1 (11 lbs) and ESI-CRYL 715 (9888 lbs) are introduced with the agitation stopped when approximately 3000 pounds of the ESI-CRYL 715 is added. After completing the addition of the ESI-CRYL 715 polymer, a second aliquot of water (1656 lbs) is introduced into the system. The mixer is then turned on and the agitation begins before the addition of Foamaster SA-3 (10 lbs), SCT-275 (158 lbs, rheology control agent), and Acrysol® TT-935 (321 lbs, rheology control agent). The mixture is then allowed to mix for 30 minutes and the Troysan 192 (66 lbs) and a pre-mixed solution of the ammonia (126 lbs) and water (126 lbs) is added to the mixture. After 30 minutes of mixing the HALOX® XTAIN® L-44 (59 lbs), SURFYNOL™ 104A (22 lbs), TEXANOL (223 lbs), and Foamaster SA-3 (12 lbs). are added to the mixture. Lastly, the Thymolphthalein (0.587 lb dissolved in 34.684 lbs of denatured ethanol) is added and to the mixture and the mixture is allowed to mix for 5 minutes.

EXAMPLE V

ALTERNATE PRIMER

| Ingredient/Tradename | Preferred Wt. (lbs.) | Preferred Wt. % | Function |
|---|---|---|---|
| Water | 5153 | 31.466 | Solvent |
| DISPER N40V (Aqueous Acrylic Polymer) (Ciba Specialty Chemicals) | 30 | 0.183 | Surfactant |
| 2-Methoxy-1-Methylethyl-acetate (in ethanol)/TEGO KL245 (CAS: 108-65-6) (Goldschmidt Chemical Corporation) | 7 | 0.043 | Surfactant |
| Sodium Tripolyphosphate (Chemical Distributors) | 12 | 0.073 | Dispersing Agent |
| Nepheline Syenite/MINEX 7 (Unimin Corporation) | 4,150 | 25.341 | Pigment |
| Titanium Dioxide/TI-PURE ™ (Dupont) | 1600 | 9.77 | Pigment |
| Acrylic polymer (30% in water)/Acrysol ® TT-935 (Rohm and Haas Company) | 47 | 0.287 | Rheology Control Agent |
| Polyurethane resin (7–18%) Diethylene glycol monobutyl ether (20–21%) Water 61–63% Acrysol ™ (SCT-275) (Rhom and Haas Company) | 100 | 0.611 | Rheology Control Agent |
| Foamaster SA-3 (Oil-based Defoamer) (Cognis Corporation) | 37 | 0.226 | Defoamer |
| Latex emulsion (50% in water)/Aquamac 510 (Eastman Chemical Company) | 5061 | 30.904 | Polymer |
| HALOX ® XTAIN ® L-44 (Halox) | 48 | 0.293 | Prevents Tannin Stain |
| 4,4-dimethoxazolidine/ Troysan 192 (CAS: 51200-87-4) (Troy Chemical Company) | 49 | 0.299 | Biocide |
| Troysan Polyphase AF-1 (Troy Chemical Company) | 18 | 0.11 | Biocide |
| Phenolphthalein (CAS: 77-09-8) (Aldrich Chemical Company) | 0.32566 | 0.002 | pH Indicator |
| Denatured Ethanol (CAS: 64-17-5) (Aldrich Chemical Company) | 19.2436329 | 0.118 | Solvent for pH Indicator |
| 2-amino-2-methyl-1-propanol (CAS: 124-68-5)/ AMP-95 (95% in water) (Ashland Specialty Chemical Co.) | 45 | 0.275 | pH Adjuster |

The components are mixed in a conventional mixer such as a paddle blade mixer. The water (3,320 lbs) is introduced into the mixer, agitation is started as soon as, the water covers the mixing blade. Then the DISPER N40V (30 lbs), TEGO KL245 (7 lbs), Sodium Tripolyphosphate (12 lbs), MINEX 7 (4150 lbs), and Titanium Dioxide (1150 lbs) are introduced into the mixer. The mixture is allowed to mix for 5 minutes and then another portion of Titanium Dioxide (450 lbs) is added along with SCT-275 (100 lbs, rheology control agent), and Acrysol® TT-935 (47 lbs, rheology control agent). The resulting mixture is then allowed to mix for 20–25 minutes and Aquamac 510 (5061 lbs, polymer), water (1923 lbs), HALOX® XTAIN® L-44 (48 lbs), Troysan Polyphase AF-1 (18 lbs), Troysan 192 (49 lbs), and Foamaster SA-3 (37 lbs) are added to the mixture. Lastly, the Phenolphthalein (0.326 lb dissolved in 19.244 lbs of denatured ethanol) is added and the mixture is allowed to mix for 5 minutes.

EXAMPLE VI

Wallpaper Activator

| Ingredient/Trade Name | Preferred Wt. (lbs) | Preferred Wt. % | Function |
|---|---|---|---|
| Water | 500 | 96.135 | Solvent |
| UCAR ™ Polyphobe ™ (Dow Chemical) | 15 | 2.884 | Rheology Control Agent |
| Methylhydroxyethylcellulose/ Culminal (CAS: 9032-42-2) (Hercules Incorporated) | 2 | 0.385 | Adhesive Polymer |
| Sodium Hydroxide (50% aqueous solution) (CAS: 001310-73-2) | 1.11 | 0.213 | pH Adjuster |
| 4,4-dimethoxazolidine/Troysan 192 (CAS: 51200-87-4) (Troy Chemical Company) | 1 | 0.192 | Biocide |
| Thymolphthalein (CAS: 125-20-2) (Aldrich Chemical Company) | 0.011 | 0.002 | pH Indicator |
| Denatured Ethanol (CAS: 64-17-5) (Aldrich Chemical Company) | 0.65 | 0.125 | Solvent for pH Indicator |
| 2-amino-2-methyl-1-propanol (CAS: 124-68-5)/AMP-95 (95% in water) (Ashland Specialty Chemical Co.) | 0.33 | 0.063 | pH Adjuster |

The components are mixed in a conventional mixer such as a paddle blade mixer. The water (500 lbs) is introduced into the mixer, agitation is started as soon as the water covers the mixing blade. The UCAR™ Polyphobe™ (15 lbs) and the Culminal (2 lbs) is then added and the mixture is stirred until a slurry if formed. The Sodium Hydroxide (1 lb) is then added to raise the pH to approximately 8.1, and the Thymolphthalein (0.011 lb dissolved in 0.65 lb of denatured ethanol) is added and to the mixture. Then, the 2-amino-2-methyl-1-propanol (0.33 lb) and sodium hydroxide (0.11 lb) are added to raise the pH to between 11.0 and 11.5 and a blue color develops.

What is claimed:

1. A wet wallpaper adhesive composition comprising water, an adhesive polymer, a pH adjuster that evaporates when the composition is dried, and a pH indicator, wherein said pH indicator provides a visible color when wet and provides no visible color when dry.

2. The adhesive of claim 1, wherein said wallpaper adhesive comprises, water from about 20% to about 95% by weight, based on the total weight of the composition, an adhesive polymer from about 5% to about 80% by weight, based on the total weight of the composition, a polymer stabilizer from about 0% to about 2% by weight, based on the total weight of the composition, a humectant from about 0% to about 30% by weight, based on the total weight of the composition, a biocides from about 0% to about 2% by weight, based on the total weight of the composition, a defoamer from about 0% to about 1% by weight, based on the total weight of the composition, a pH adjuster from about 0% to about 20% by weight, based on the total weight of the composition, and a pH Indicator from about 0.001% to about 5% by weight, based on the total weight of the composition.

3. The adhesive of claim 1, wherein said pH indicator is selected from the group consisting of 6,8-dinitro-2,4-(1H) quinazolinedione; p-nitrophenol; o-cresolphthalein; ethyl bis(2,4-dimethylphenyl) ethanoate; phenolphthalein; thymolphthalein; 1,3,5-trinitrobenzene; 2,4,6-trinitrotoluene; and combinations thereof.

4. The adhesive of claim 3, wherein said pH indicator is selected from the group consisting of thymolphthalein, phenolphthalein, and combinations thereof.

5. The adhesive of claim 1, wherein said pH indicator comprises from about 0.001% to about 5% by weight, based on the total weight of the composition.

6. The adhesive of claim 5, wherein said pH indicator comprises from about 0.01% to about 0.1% by weight, based on the total weight of the composition.

7. The adhesive of claim 1, wherein said adhesive polymer is selected from the group consisting of cellulose, starch, polyvinyl acetate and derivatives and copolymers thereof, polyvinyl alcohol and derivatives and copolymers thereof, latex and derivatives and copolymers thereof, acrylics and copolymers thereof, and combinations thereof.

8. The adhesive of claim 1, wherein said adhesive polymer comprises from about 5% to about 80% by weight, based on the total weight of the composition.

9. The adhesive of claim 7, wherein said adhesive polymer is starch.

10. The adhesive of claim 9, wherein said starch is selected from the group consisting of corn starch, wheat starch, and combinations thereof.

11. The adhesive of claim 9, wherein said adhesive polymer comprises from about 5% to about 40% by weight, based on the total weight of the composition.

12. The adhesive of claim 7, wherein said adhesive polymer is cellulose.

13. The adhesive of claim 12, wherein said adhesive polymer comprises from about 5% to about 40% by weight, based on the total weight of the composition.

14. The adhesive of claim 1, further comprising an additive selected from the group consisting of a biocide, polymer stabilizer, rheology control agent, defoamer, pH adjuster, humectant, and combinations thereof.

15. The adhesive of claim 14, wherein said biocide is selected from the group consisting of 4,4-dimethoxazolidine, 2(hydroxymethyl)amino ethanol, Troysan Polyphase AF-1, methyl benzimidazole-2-yl carbamate, 1,3-dihydroxymethyl-5,5-dimethylhydantoin, 1-hydroxymethyl-5,5-dimethylhydantoin, 2-n-octyl-4-isothiazolin-3-one, and combinations thereof.

16. The adhesive of claim 14, wherein said biocide wherein comprises from about 0.01% to about 2% by weight, based on the total weight of the composition.

17. The adhesive of claim 14, wherein said polymer stabilizer comprises from about 0.01% to about 2% by weight, based on the total weight of the composition.

18. The adhesive of claim 14, wherein said rheology control agent comprises from about 0.1% to about 25% by weight, based on the total weight of the composition.

19. The adhesive of claim 14, wherein said defoamer comprises from about 0.01% to about 4% by weight, based on the total weight of the composition.

20. The adhesive of claim 14, wherein said pH adjuster comprises from about 0.01% to about 20% by weight, based on the total weight of the composition.

21. The adhesive of claim 14, wherein said humectant comprises from about 0.1% to about 20% by weight, based on the total weight of the composition.

22. A wet wallpaper primer composition comprising water, a polymer, a pH indicator, and a pH adjuster that evaporates when the composition is dried, wherein said pH indicator provides a visible color when wet and provides no visible color when dry.

23. The primer of claim 22, wherein said primer comprises, water from about 50% to about 95% by weight, based on the total weight of the composition, a polymer from about 5% to about 50% by weight, based on the total weight of the composition, a rheology control agent from about 0% to about 8% by weight, based on the total weight of the composition, a biocides from about 0% to about 2% by weight, based on the total weight of the composition, a co-solvent from about 0% to about 5% by weight, based on the total weight of the composition, a pigment from about 0% to about 35% by weight, based on the total weight of the composition, a pH adjuster from about 0% to about 20% by weight, based on the total weight of the composition, and a pH Indicator from about 0.001% to about 5% by weight, based on the total weight of the composition.

24. The primer of claim 22, wherein said pH indicator is selected from the group consisting of 6,8-dinitro-2,4-(1H) quinazolinedione; p-nitrophenol; o-cresolphthalein; ethyl bis(2,4-dimethylphenyl) ethanoate; phenolphthalein; thymolphthalein; 1,3,5-trinitrobenzene; 2,4,6-trinitrotoluene; and combinations thereof.

25. The primer of claim 24, wherein said pH indicator is thymolphthalein, phenolphthalein, and combinations thereof.

26. The primer of claim 22, wherein said pH indicator comprises from about 0.001% to about 5% by weight, based on the total weight of the composition.

27. The primer of claim 26, wherein said pH indicator comprises from about 0.01% to about 0.1% by weight, based on the total weight of the composition.

28. The primer of claim 22, wherein said polymer is selected from the group consisting of acrylic based polymers and copolymers thereof, vinyl acetate based polymers and copolymers thereof, styrene butadiene rubbers and copolymers thereof, latex and copolymer thereof, and combinations thereof.

29. The primer of claim 22, wherein said polymer comprises from about 5% to about 50% by weight, based on the total weight of the composition.

30. The primer of claim 28, wherein said polymer is an acrylic based polymer or a copolymer thereof.

31. The primer of claim 28, wherein said polymer is a vinyl acetate based polymer or a copolymer thereof.

32. The primer of claim 22, further comprising an additive selected from the group consisting of a biocide, polymer stabilizer, rheology control agent, defoamer, pH adjuster, humectant, and combinations thereof.

33. The primer of claim 32, wherein said biocide is selected from the group consisting of 4,4-dimethoxazolidine, 2(hydroxymethyl)amino ethanol, Troysan Polyphase AF-1, methyl benzimidazole-2-yl carbamate, 1,3-dihydroxymethyl-5,5-dimethylhydantoin 1-hydroxymethyl-5,5-dimethylhydantoin, 2-n-octyl-4-isothiazolin-3-one, and combinations thereof.

34. The primer of claim 32, wherein said biocide wherein comprises from about 0.01% to about 2% by weight, based on the total weight of the composition.

35. The primer of claim 32, wherein said polymer stabilizer comprises from about 0.01% to about 2% by weight, based on the total weight of the composition.

36. The primer of claim 32, wherein said rheology control agent comprises from about 0.1% to about 25% by weight, based on the total weight of the composition.

37. The primer of claim 32, wherein said defoamer comprises from about 0.01% to about 4% by weight, based on the total weight of the composition.

38. The primer of claim 32, wherein said pH adjuster comprises from about 0.01% to about 20% by weight, based on the total weight of the composition.

39. The primer of claim 32, wherein said humectant comprises from about 0.1% to about 20% by weight, based on the total weight of the composition.

40. In a wet adhesive composition comprising, water and an adhesive polymer, the improvement comprising the addition of a pH adjuster that evaporates when the composition is dried, and a sufficient amount of a pH indicator such that the pH indicator imparts a visible color to said adhesive composition when said adhesive composition is wet and does not impart a visible color to said adhesive composition when said adhesive composition is dry.

41. The adhesive of claim 40, wherein said adhesive is a wallpaper adhesive.

42. The adhesive of claim 40, wherein said pH indicator is selected from the group consisting of 6,8-dinitro-2,4-(1H) quinazolinedione; p-nitrophenol; o-cresolphthalein; ethyl bis(2,4-dimethylphenyl) ethanoate; phenolphthalein; thymolphthalein; 1,3,5-trinitrobenzene; 2,4,6-trinitrotoluene; and combinations thereof.

43. The adhesives of claim 42, wherein said pH indicator is thymolphthalein, phenolphthalein, and combinations thereof.

44. The adhesive of claim 40, wherein said pH indicator comprises from about 0.001% to about 5% by weight, based on the total weight of the composition.

45. The adhesive of claim 44, wherein said pH indicator comprises from about 0.01% to about 0.1% by weight, based on the total weight of the composition.

46. The adhesive of claim 40, wherein said adhesive polymer is selected from the group consisting of cellulose, starch, polyvinyl acetate and derivatives and copolymers thereof, polyvinyl alcohol and derivatives and copolymers thereof, latex and derivatives and copolymers thereof, acrylics and copolymers thereof, and combinations thereof.

47. The adhesive of claim 46, wherein said adhesive polymer is starch.

48. The adhesive of claim 47, wherein said adhesive polymer comprises from about 5% to about 40% by weight, based on the total weight of the composition.

49. The adhesive of claim 46, wherein said adhesive polymer is cellulose.

50. The adhesive of claim 49, wherein said adhesive polymer comprises from about 5% to about 40% by weight, based on the total weight of the composition.

51. The adhesive of claim 40, further comprising an additive selected from the group consisting of a biocide, polymer stabilizer, rheology control agent, defoamer, pH adjuster, humectant, and combinations thereof.

52. The adhesive of claim 51, wherein said biocide is selected from the group consisting of 4,4-dimethoxazolidine, 2(hydroxymethyl)amino ethanol, Troysan Polyphase AF-1, methyl benzimidazole-2-yl carbamate, 1,3-dihydroxymethyl-5,5-dimethylhydantoin, 1-hydroxymethyl-5,5-dimethylhydantoin, 2-n-octyl-4-isothiazolin-3-one, and combinations thereof.

53. The adhesive of claim 52, wherein said biocide comprises from about 0.01% to about 2% by weight, based on the total weight of the composition.

54. The adhesive of claim 51, wherein said polymer stabilizer comprises from about 0.01% to about 2% by weight, based on the total weight of the composition.

55. The adhesive of claim 51, wherein said rheology control agent comprises from about 0.1% to about 25% by weight, based on the total weight of the composition.

56. The adhesive of claim 51, wherein said defoamer comprises from about 0.01% to about 4% by weight, based on the total weight of the composition.

57. The adhesive of claim 51, wherein said pH adjuster comprises from about 0.01% to about 20% by weight, based on the total weight of the composition.

58. The adhesive of claim 51, wherein said humectant comprises from about 0.1% to about 20% by weight, based on the total weight of the composition.

59. A method of adhering a paper to a wall comprising, applying a wet, colored adhesive to said wall or to a back surface of said paper, and prior to adhering said back surface to said wall, inspecting the adhesive for continuous color on the entire area where adhesive was applied, and then applying more of said wet, colored adhesive or more water where the adhesive is colorless, and then adhering said paper to said wall, and allowing said wet, colored adhesive to dry and become colorless.

60. The method of claim 59, wherein said colored adhesive is a composition comprising water, an adhesive polymer, and a pH indicator, wherein said pH indicator provides a visible color when wet and provides no visible color when dry.

61. The methods of claim 60, wherein said pH indicator is thymolphthalein, phenolphthalein, and combinations thereof.

62. The method of claim 60, wherein said pH indicator comprises from about 0.001% to about 5% by weight, based on the total weight of the composition.

63. The method of claim 62, wherein said pH indicator comprises from about 0.01% to about 0.1% by weight, based on the total weight of the composition.

64. The method of claim 60, wherein said adhesive polymer is selected from the group consisting of cellulose, starch, polyvinyl acetate and derivatives and copolymers thereof, polyvinyl alcohol and derivatives and copolymers thereof, latex and derivatives and copolymers thereof, acrylics and copolymers thereof, and combinations thereof.

65. The method of claim 60, further comprising an additive selected from the group consisting of a biocide, polymer stabilizer, rheology control agent, defoamer, pH adjuster, humectant, and combinations thereof.

66. A wet wallpaper activator solution comprising water, an adhesive polymer, a pH indicator, and a pH adjuster that evaporates when the composition is dried, wherein said pH indicator provides a visible color when wet and provides no visible color when dry.

67. The wallpaper activator of claim 66, wherein said wallpaper activator comprises, water from about 60% to about 99.1% by weight, based on the total weight of the composition, an adhesive based adhesive polymer from about 0.1% to about 40% by weight, based on the total weight of the composition, a rheology control agent from about 0% to about 20% by weight, based on the total weight of the composition, a biocide from about 0% to about 2% by weight, based on the total weight of the composition, a co-solvent from about 0% to about 5% by weight, based on the total weight of the composition, a pigment from about 0% to about 35% by weight, based on the total weight of the composition, a pH adjuster from about 0% to about 20% by weight, based on the total weight of the composition, and a pH Indicator from about 0.001% to about 5% by weight, based on the total weight of the composition.

68. A method of applying a paper to a wall comprising, applying a wet, colored adhesive to said wall or to a surface of said paper to provide said wall or said surface of said paper with a color intensity, and prior to adhering said adhesive to said paper or to said surface of said wall, inspecting said color intensity of said applied adhesive to determine the uniformity of said color intensity, and where said color intensity is uneven, spreading said wet, colored adhesive on said wall or said surface of said paper to achieve a uniform color intensity; or adding additional wet, colored adhesive to said wall or said surface of said paper to achieve a uniform color intensity; or adding water to said wall or said back surface to achieve a uniform color intensity.

* * * * *

UNITED STATES PATENT AND TRADEMARK OFFICE
CERTIFICATE OF CORRECTION

PATENT NO.     : 6,894,095 B2
DATED          : May 17, 2005
INVENTOR(S)    : Gerald Russo et al.

It is certified that error appears in the above-identified patent and that said Letters Patent is hereby corrected as shown below:

Title page,
Item [73], Assignee, "The Dial Corporation, Scottsdale, AZ (US)" should be
-- Roman Decorating Products, Calumet City, IL (US) --.

Signed and Sealed this

Twenty-fifth Day of October, 2005

JON W. DUDAS
*Director of the United States Patent and Trademark Office*